3,357,576
APPARATUS FOR LOADING AND TRANSPORTING PARTICULATE MATERIAL
Carl E. Strombeck, P.O. Box 95, Loleta, Calif. 95551, and Chris Nicolos, P.O. Box 515, Samoa, Calif. 95564
Filed Aug. 26, 1965, Ser. No. 482,870
5 Claims. (Cl. 214—83.26)

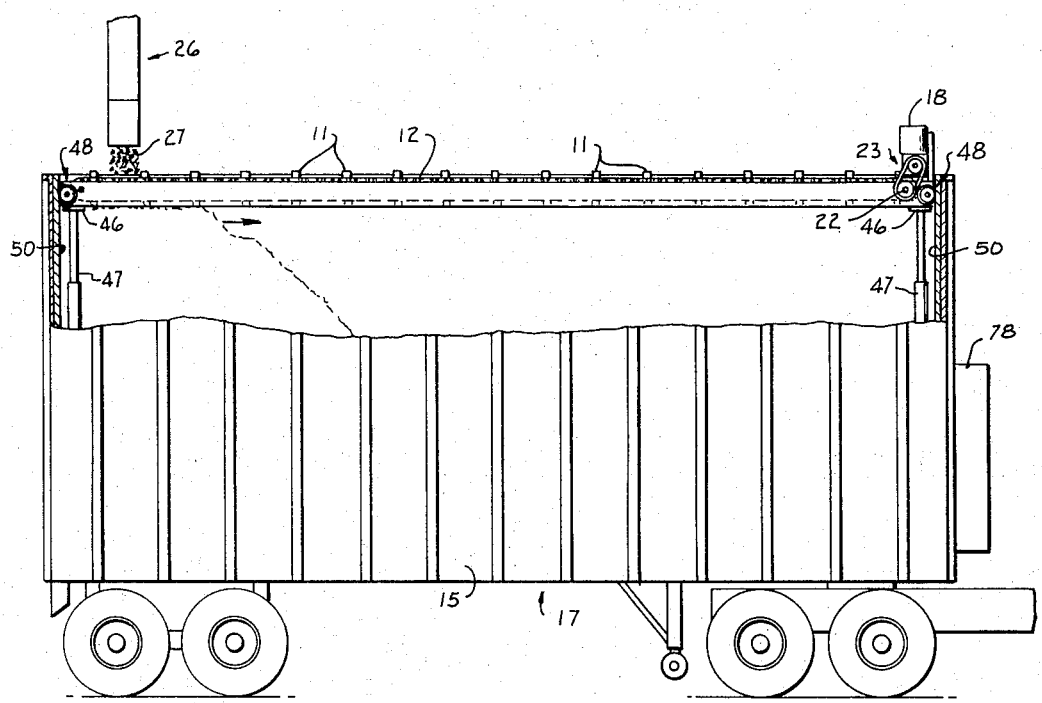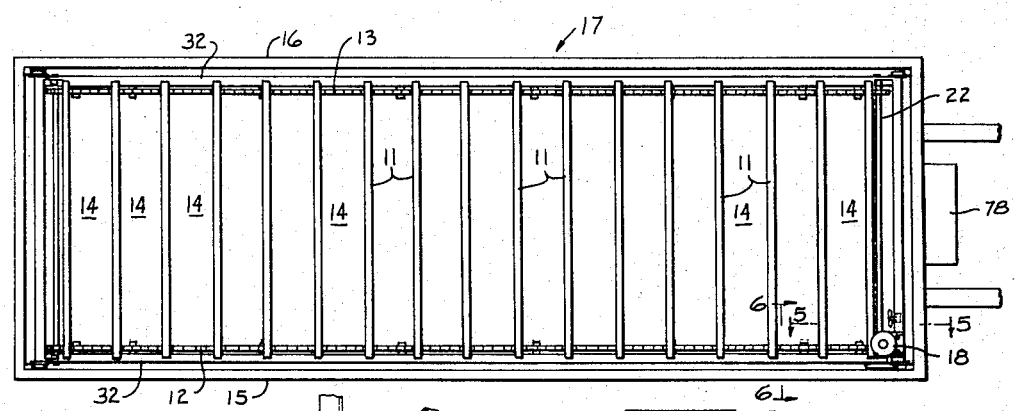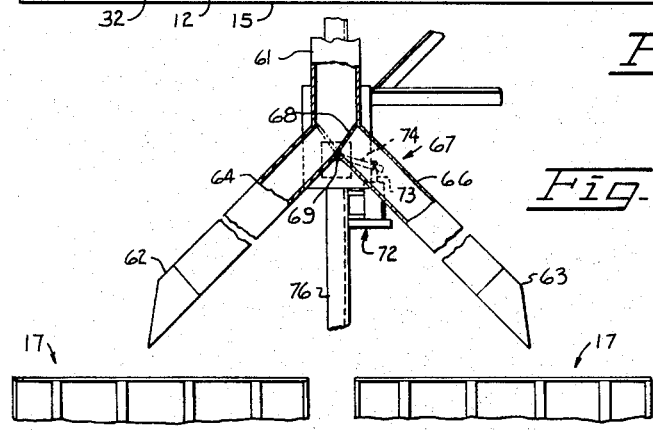

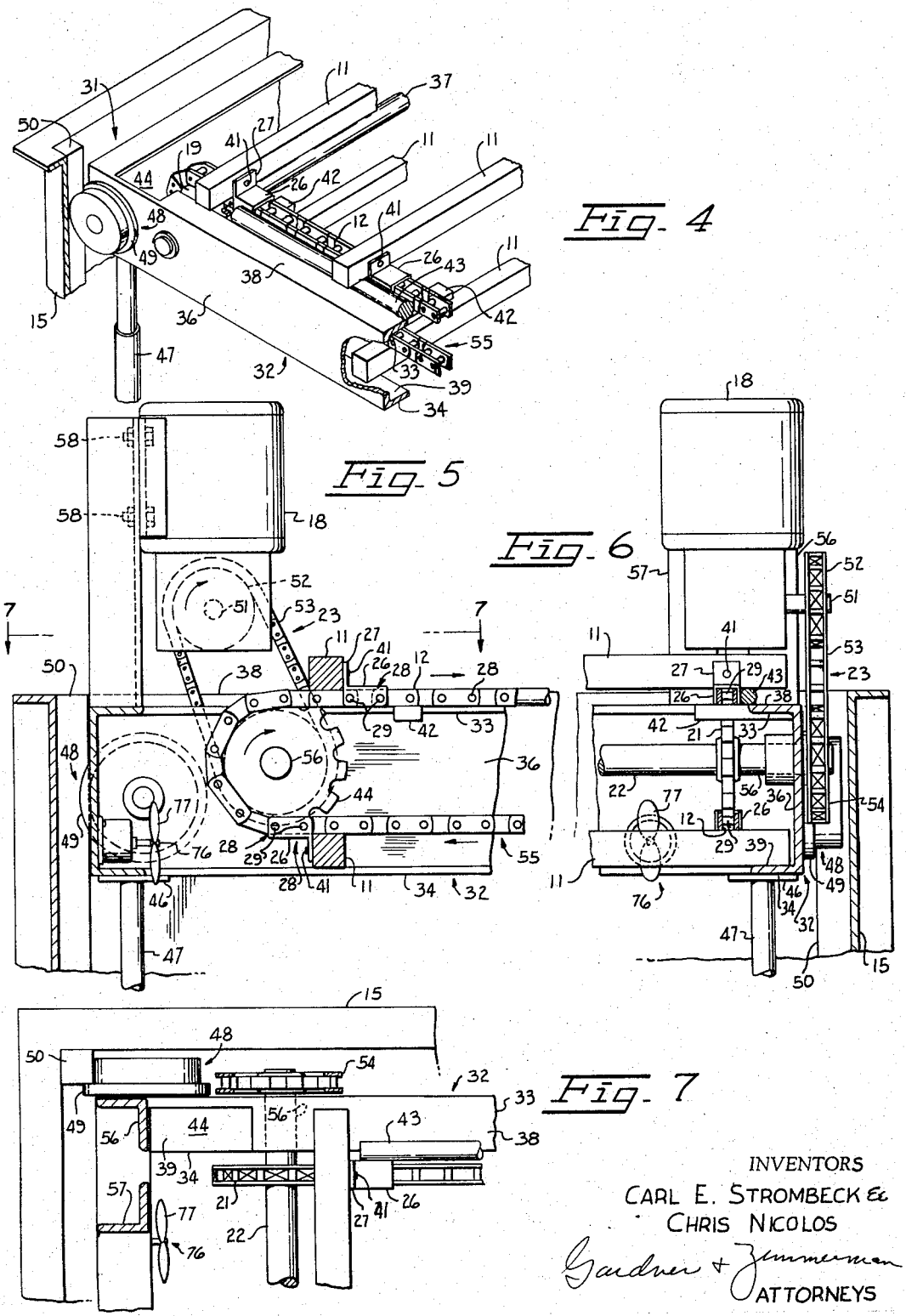

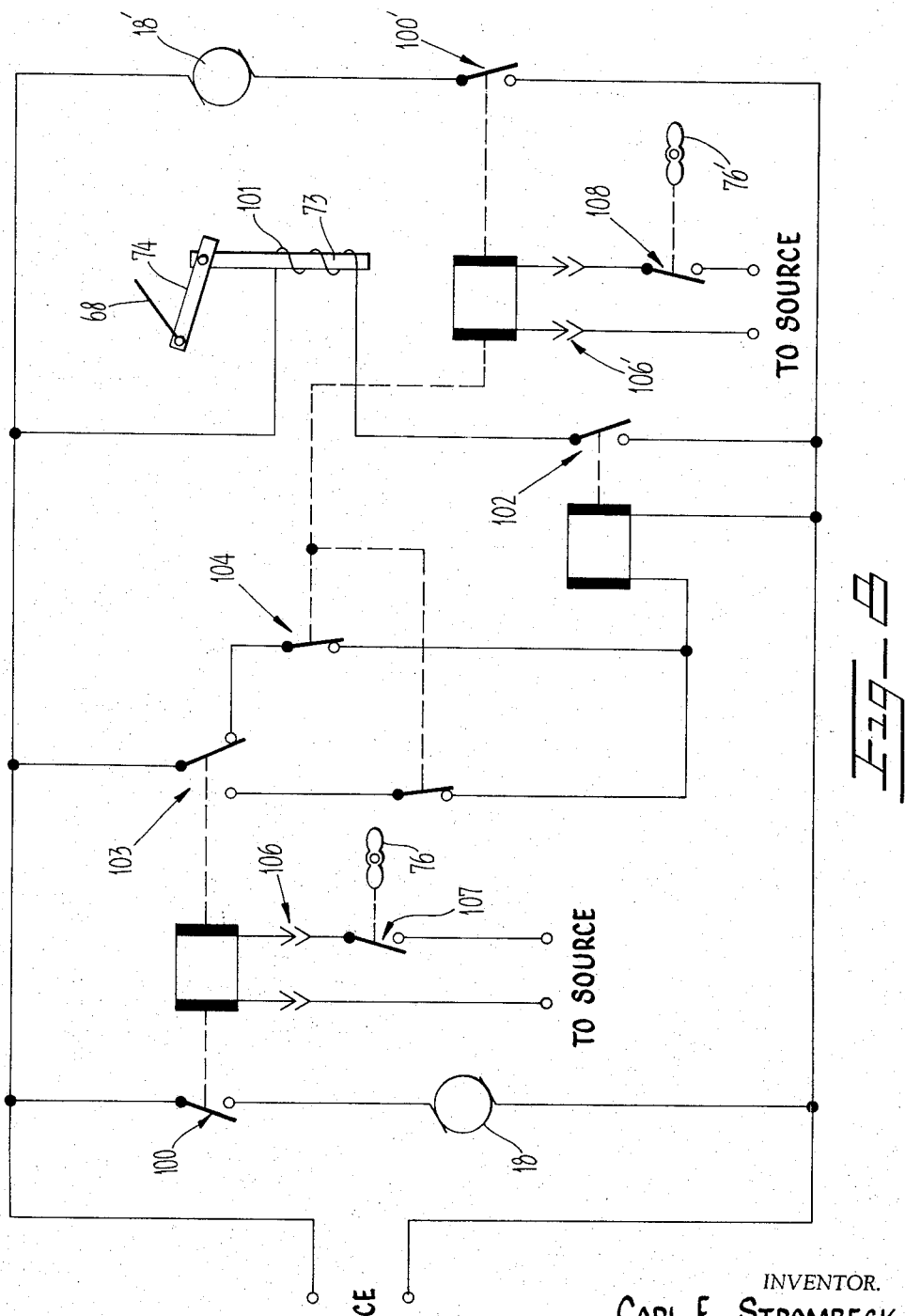

ABSTRACT OF THE DISCLOSURE

The disclosure relates to truck vans of the type in which wood chip and slash fragments are loaded and transported, and more particularly to an apparatus mounted within the van for evenly distributing the wood fragments throughout the van as they are loaded. The apparatus comprises a plurality of slats mounted between two endless chains to extend transversely over the van opening. The chains extend lengthwise of the van and are mounted on sprockets at each end of the van. A motor and chain drive is provided for rotating the sprockets to move the chains and hence the slats through a plane above the bed of the van. As wood fragments flow through the moving slot structure into the van, the slats distribute the same throughout the van. Hydraulic jacks support the structure upon which the sprockets are mounted so that the height of the plane through which the chains and slats move can be adjusted with respect to the bed of the van, and a level sensing means in the van stops the slat driving motor and flow of wood fragments into the van when the level of such fragments reaches a predetermined point.

---

The present invention relates generally to the storage of particulate material and, more particularly, to a method and apparatus for loading and storing particulate material such as wood slash and chips in truck van units.

Slash and chip wood fragments are used in the manufacture of various wood products, for example, wood fiberboard, compressed wood fiberlogs and pulpwood for the manufacture of paper. The slash and chips are produced at lumber mills, and at wood sites and other locations where tree cutting, stripping, or logging operations are concentrated, such production being often times as a byproduct of the manufacture of lumber. In delivering the slash or chips to the various wood product industries, it is generally necessary to transport the wood fragments from the mills to distant factories. The loading for this transportation has been, in the past, accomplished in two time-spaced independent steps. First, the slash or chips are conveyed to large storage areas for retention until the wood fragments are to be delivered. In the second step, the stored slash or chips are loaded from the storage areas into vans which are to be transported by truck.

Such a procedure as set forth hereinabove is necessarily characterized by the undesirable excess expense and expenditure of time which naturally accompanies dual handling of materials. Considerable advantage is therefore to be gained by a provision of a single step loading and storing procedure in which the slash trimmings or chips are taken directly from the mill or woods sites, and immediately readied for transportation. By providing such a procedure, the above noted excess expense and expenditure of time in handling is eliminated.

In the method of the present invention, it is contemplated that the slash trimmings yielded by the various sawing operations at a mill, or chips produced from the slash by a chipper, will be conveyed directly to and loaded into open top vans. The loaded vans serve the dual purpose of storing the wood fragments until they are to be transported and also as carriers of the wood fragments in the transportation thereof by truck. By such a loading and storing procedure considerable time and expense is saved in providing and transporting wood fragments to users, especially where the demand for such fragment materials approximates the rate of production of the slash and chips. For example, by omitting the intermediate step of storing the slash or chips in large storage areas, the space required thereby can be put to a more beneficial use, while at the same time, the equipment especially adapted for loading the vans is no longer required. Conveyors are now generally used to transport the slash and chips to the storage areas and these same carriers can be used to directly load the vans. Thus, no additional equipment is required to load and store the wood fragments in accordance with the method of the present invention, except possibly a few additional vans. Additionally, by eliminating the pre-storage of the slash and chips, personnel normally employed in maintaining and operating the storage area can be utilized in other more productive areas. Also, since by the present loading and storing method, the slash or chips are stored ready for shipment, the time between the receipt of an order for delivery and the transportation of the wood fragments is considerably reduced.

In loading the slash and chips into vans for transportation, it has been the prevailing practice to load the fragments by positioning an open top van beneath the spout of a discharge chute which conveys the wood fragments from a storage area to the loading site. Of course, it is desirable that the wood fragments be evenly distributed in the van into which they are loaded. With such even distribution, a more voluminous load can be stored in the vans. Furthermore, where the moisture content of the wood fragments is high and hence the weight of the fragments is much greater, the concentration of the load at any one point within the van, will result in a tendency for the van to flex considerably as it is moving. This flexing not only gives rise to an uncomfortable ride for the operator of the truck, tends to structurally weaken the van, but also will overload the axles of the trailer and truck.

To accomplish an even distribution of the wood fragment load throughout the vans, one of two procedures is generally put into practice; redistributing the fragments by manually raking the mounds formed as the van is loaded, or attaching the vans to a windlass which is operated to draw the vans slowly beneath the chute's spout as the wood fragments are deposited therein. In both cases, evenly distributed loads are obtained repeatedly only with difficulty and at least one load lever attendant is required to be present at all times. For example, manually raking is an exceedingly slow and awkward process. Even in the case of the windlass controlled leveling process, the load is not as evenly distributed as would be required to optimize the load since the wood fragments would be discharged into the van along a single path running, for example, the length of the van.

Hence, in addition to the loading and storing method of the present invention, apparatus is contemplated to complement the loading procedure of the instant method whereby the load of wood slash or chips being placed into the vans may be maintained automatically substantially level over the entire length and width of the vans. More particularly, an aperture structure defining a generally planar surface segment is translatably mounted to the open top van. The apertured structure is arranged with its planar surface in facing relationship to the bed of the van. The apertures of the structure afford the means through which slash and chips may be loaded into the van. By translating or propelling, for example by suitable motor power, the apertured structure through a planar surface zone over at least a part of the van bed as the slash or chips are being loaded therein, the load can be maintained substantially level. As noted hereinbefore, this leveling results in optimizing the distribution of the load in the vans and, hence, utilization of storage space. It also minimizes the structural fatigue resulting to the vans during transportation.

By fully automating the load leveling apparatus of the present invention, the loading of the vans can be accomplished rapidly while minimizing the total man-hours required in the loading and storing process. Therefore, it is additionally intended that a suitable load level sensing means will be adapted to the load leveling apparatus to detect the level of the load. When the load reaches a predetermined level, the sensing means will operate to terminate the loading of the vans and, for example, switch the flow of wood slash or chips to another van. As can clearly be seen from the foregoing, by utilizing the load leveling apparatus noted above in an automatic operation with a network of loading points, it is now possible for a single individual to handle all of the tasks required in filling many vans rapidly with level loads of wood slash or chips.

Accordingly, it is a primary object of this invention to provide a method and apparatus for storing and loading for transportation wood fragments from a lumber mill or woods site operation with a minimum amount of handling of the fragments.

More particularly, an object of the present invention is to provide a method and appartus for loading and storing in vans in a single continuous procedure wood fragments from a lumber mill, etc.

Another object of the invention is to provide an automatically controlled multiple van loading procedure uniquely adapted to loading and storing therein in a single continuous procedure wood fragments from the mill.

It is yet another object of the invention to optimize the wood fragment load of vans used for the storage and transportation thereof.

A further object of the invention is to provide load leveling apparatus adapted to evenly distribute wood fragment loads through vans utilized in storing and transporting the fragments.

Still another object of the invention is to provide a van load leveling apparatus adapted to evenly distribute in the van varying load sizes of wood fragments.

It is still a further object of the invention to provide a van load leveling apparatus uniquely adapted to terminate the loading of the van when the load attains a predetermined evenly distributed level.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adapted within the scope of the invention as set forth in the claims.

FIGURE 1 is a side view of a spaced bar and link chain conveyor embodiment of the wood slash and chip load leveler of the present invention mounted to a conventional open top van used to store and transport the slash and chips.

FIGURE 2 is a plan view of the load leveler of FIGURE 1.

FIGURE 3 is an illustration of a dual-spout discharge chute adapted to deliver wood slash or chips to separate van loading sites.

FIGURE 4 is an isometric view of a portion of the preferred load leveler embodiment detailing the supporting structure for the spaced bars and the manner in which they are attached to the link chain conveyor.

FIGURE 5 is an enlarged sectional view taken at lines 5—5 of FIGURE 2.

FIGURE 6 is an enlarged sectional view taken at lines 6—6 of FIGURE 2.

FIGURE 7 is a sectional view taken at lines 7—7 of FIGURE 5.

FIGURE 8 is a schematic electrical diagram of the control circuit for the apparatus.

With reference to the drawings, and in particular FIGURES 1 and 2, the load leveler apparatus of the present invention is seen to comprise a plurality of leveling bars 11 mounted between and spaced along first and second parallelly spaced continuous link chain conveyors 12 and 13 respectively to define apertures 14 through which the wood fragments can be loaded. The continuous link chains 12 and 13 are respectively positioned, preferably in the same plane, proximate opposite sides 15 and 16 of an open top van 17 to define with bars 11 and apertured structure extending substantially the entire length and width of van 17. Bars 11 are set in motion along the length of van 17 by transmitting power from a motor 18 to link chain conveyors 12 and 13 via a suitable motion transfer mechanism. In practice, it has been found particularly expedient to revolve and guide in synchronous relation each of the link chains 12 and 13 respectively by an idler sprocket 19 and a shaft driven sprocket 21 (see FIGURES 4 and 6 respectively), the driven sprocket 21 being coupled to motor 18 by a drive shaft 22 and a single-strand roller-chain drive 23. The link chains 12 and 13 are revolved synchronously by mounting their respective driven sprockets 21 on drive shaft 22.

In operation, the open top van 17 is is positioned beneath the spout 24 of a discharge chute 26. The wood slash or chips delivered by chute 26 are discharged by spout 24 into van 17 through the apertures 14 of the load leveling structure defined by bars 11 and link chains 12 and 13. As the van 17 is loaded, there is a tendency for the wood fragments to form mounds as they fall from chute 26 into van 17. As noted hereinbefore, the formation of such mounds results in the undesirable uneven load distribution in van 17. However, by energizing the load leveler to translate bars 11 along the length of van 17, the excess slash or chips forming the mounds can be distributed by bars 11 through a dragging operation to areas of van 17 filled to lesser heights. By appropriately adjusting the elevation of the load leveler within van 17, the wood fragments will be evenly distributed substantially throughout the van.

For a detailed description of a preferred link chain and bar load leveler assembly, attention is directed specifically to FIGURES 4–6. From these figures, it is seen that the leveling bars 11 are mounted proximate their respective ends to the outside of the loop formed by the continuous link chains 12 and 13. Considering now only link chain 12, a plurality of U-shaped brackets 26, each having a flange 27, are positioned to straddle at spaced intervals chain 12 with flange 27 extending outwardly away from the chain. To simplify the assembly of the load leveler, brackets 26 are preferably secured at link joints 28 of chain 12 by linkage pins 29 of the chain links. Rectangular leveling bars 11 are mounted proximate a first end thereof to link chain 12 by securing them to flanges 27. To minimize the weight of the load leveler, the leveling bars 11 are preferably made from wood. The other end of each bar 11 is similarly mounted to chain 13. The ends of the bars 11 are secured respectively to chains 12 and 13 so that the bars 11 extend therebetween in a perpendicular relationship thereto.

To support the load leveling assembly and aid in guiding the leveling bars 11 as they are conveyed by chains 12 and 13, a special supporting structure 31 is provided which includes U-shaped channel members 32 mounted along and proximate each side 15 and 16 of van 17, the channels thereof facing inward. More specifically, the structure 31 preferably is a rectangular-like frame slightly smaller than the cross section of the van to which it is to be adapted. The rectangular frame structure 31 is mounted within van 17 in a horizontal plane proximate the inner periphery of van 17. Structure 31 has a U-shaped cross section at least along the frame sections adjacent van sides 15 and 16. The U-shaped sections of frame 31 are defined by upper and lower planar flanges 33 and 34 which extend inward from an interconnecting web 36 positioned parallel to and proximate the side of van 17. Flanges 33 and 34 serve as guides for bars 11 as they are carried along the length of van 17 by chains 12 and 13.

The precise manner recommended for supporting the continuous link chains 12 and 13 by the structure 31 is best described by referring particularly to FIGURES 2, 4 and 6. Referring first to FIGURE, 2 it is noted that the continuous link chains 12 and 13, and sprockets are mounted spaced apart from and within the region defined by the rectangular frame structure 31. As noted hereinbefore, each chain 12 and 13 is driven and guided by separate driven sprockets 21 and idler sprockets 19. Looking now to FIGURE 4, the end of chain 12 guided by idler sprocket 19 is supported by journally mounting one end of an idler shaft 37 to web 36. The idler shaft 37 extends from web 36 to couple together the idler sprockets 19 of chains 12 and 13, and journally connect at its other end to the U-shaped channel 32 of structure 31 opposite web 36. By this arrangement one end of each continuous link chains 12 and 13 is supported by mutually driven idler sprockets 19. It should be noted that idler shafts 37 could be kept fixed and each idler sprocket 19 journally mounted thereto.

As can be seen by referring to FIGURE 6, the end of chain 12 driven by the driven sprocket 21 is supported by journally mounting one end of drive shaft 22 to web 36. The other end of drive shaft 22 is similarly journally mounted to the V-shaped channel 32 of structure 31 opposite web 36. The foregoing exemplifies one preferred manner of supporting the continuous link chains 12 and 13. The following description will illustrate one apparatus arrangement for guiding leveling bars 11 as they are transported around the loop defined by the continuous link chain conveyor.

With particular reference to FIGURES 2 and 4–6, guidance and additional support for leveling bars 11 are obtained by adjusting the lengths of bars 11 so that they extend beyond chains 12 and 13. In between sprockets 19 and 21, the ends of bars 11 rest on the upper surfaces 38 and 39 of flanges 33 and 34 respectively. However, such a support of the bars 11 results in the bars serving as suspension points for the chains 12 and 13 as the bars 11 travel along the upper surfaces 38 of flanges 33. Such a suspension transmits an undesidable strain to the mounting points 41 of bars 11 and flanges 27. To remove this strain, spaced tab projections 42 of the upper planar flanges 33 are provided. The tabs 42 extend from flange 33 to support chains 12 and 13 at their respective undersides. Whenever the chains are supported in this manner, it is further contemplated that a suitable guide 43 will be interposed bars 11 and upper surfaces 38 of each of the flanges 33, with the guides 43 being secured to flanges 33. The lengths of guides 43 are selected so that they extend substantially over the entire distance between sprockets 19 and 21. Furthermore, the widths of guides 43 are chosen to be comparable to the thickness of the chains. By supporting the chains in the manner set forth immediately above, a minimum amount of strain is imparted to the points 41 of connection of chains 12 and 13, and bars 11.

With reference to FIGURES 5 and 6, it is noted that no undesirable strain is transmitted to the chains and bars as they travel along surfaces 39 of flanges 34. This is because the link chains 12 and 13, and bars 11 are supported from beneath as they are guided along surfaces 39 whereby bars 11 rest on surfaces 39, and link chains 12 and 13 in turn rest on bars 11.

Considering now FIGURES 4 and 7, as the chains 12 and 13 are driven to convey bars 11 around the loop formed thereby, a passageway through flanges 33 must be provided in order that bars 11 can be conveyed from the upper flanges 33 to the lower flanges 34. Hence, at each end of flanges 33 proximate the corners formed by the walls of van 17, a portion of the flanges 33 are cut away to form a passageway 44 therethrough.

In some applications of the load leveler described supra it may be desirable to be able to adjust the elevation of the link chain conveyor and bar assembly within van 17. To provide such a capability, means are contemplated for raising or lowering the assembly to selected elevation points within van 17. Specifically, attention is directed to FIGURES 1, 4–6 wherein it is shown that each corner of supporting structure 31 rests on the top 46 of a piston 47 of an adjustable hydraulic jack. To provide proper guidance for the supporting structure 31 as it is raised or lowered by piston 47, a wheel 48 with a guide lip 49 is journally mounted to the side of each corner of structure 31 to ride along a guide rail 50 mounted vertically within van 17 at each of its corners. For ease of elevation adjustment of supporting structure 31, it is preferred to operate the hydraulic jacks which control pistons 47 collectively as a unit.

Referring now to FIGURES 1, 5 and 6, continuous link chains 12 and 13 are driven in synchronous relation by motor 18 coupled to the chains by the single-strand roller-chain drive 23. More specifically, the motor's armature is connected to motor drive shaft 51 which in turn is adapted with a driving sprocket 52. A continuous power transmitting link chain 53 is driven by sprocket 52 to couple power delivered by motor 18 to a driven sprocket 54. Driven sprocket 54 is mounted to an extension 56 of drive shaft 22 which projects outwardly away from web 36. Upon the energization of motor 18, the single-strand roller-chain drive assembly 23 is set into motion as indicated by the arrows in FIGURE 5 to rotate the link chain-bar assembly preferably as indicated by the arrows adjacent continuous link chain 12 in FIGURES 1 and 5. Where a unidirectional type motor 18 is employed, the most evenly distributed load of wood slash or chips is obtained by positioning van 17 beneath spout 24 of discharge chute 26 so that the wood fragments are discharged into the van 17 at the end thereof at which bars 11 begin their traverse of the length of van 17 along the bottom flight 55 of the loop formed by chains 12 and 13. In loading the van 17 with such a motor 18 driving the load leveler assembly, the van 17 will first be filled to the adjusted level of leveling bars 11 at the end thereof beneath spout 24. As more wood fragments are discharged into the van 17, the leveling bars in the bottom flight 55 of the chain conveyor assembly will redistribute the fragments to other parts of van 17 by dragging same off the top of the mound formed beneath spout 24. However, it should be noted that a reversing type motor 18 equally can be employed to drive chains 12 and 13. In such a case, an even distribution of the fragments can be accomplished without regard to what particular portion of van 17 is positioned beneath spout 24. This even distribution is obtained by selectively energizing upon command motor 18 to rotate its armature 51 in opposite directions and thereby reverse the direction of travel of continuous link chains 12 and 13.

Considering now only FIGURES 5–7, the manner in which motor 18 is mounted for powering the elevation adjustable load leveler is illustrated. As shown therein, motor supports, for example, first and second spaced angle irons 56 and 57, are secured to the end of supporting structure 31 proximate the driven sprocket 21 to extend vertically therefrom. The angle irons 56 and 57 may be secured to structure 31 by any of the conventional means, i.e., welding, bolting, etc. Motor 18 is secured to the angle irons 56 and 57, for example, by bolts 58, at a distance above structure 31 which is dependent on the length of the link chain 53 of the single-strand roller-chain drive 23.

The loading of van 17 can be controlled automatically by providing a means of sensing the level of the wood fragment load in the van to, for example, simultaneously interrupt the power to motor 18 and flow of slash or chips to spout 24 of chute 26. Such automatic operation is particularly advantageous when, as shown in FIGURE 3, vans 17 are loaded sequentially at alternate points by, for example, a single chute 61 adapted with two spouts 62 and 63. The spouts 62 and 63 are connected to chute 61 respectively by branches 64 and 66 of a fork conduit 67. As illustrated in FIGURE 3, the flow of wood fragments to each spout 62 and 63 is controlled by a flapper gate 68 pivotally mounted by a shaft 69 at the common junction of branches 66 and 67. The position of the pivotally mounted gate 68 is controlled preferably by an electrically actuated piston assembly 72 which has a piston 73 linked to a lever arm 74, the lever arm 74 in turn being secured to shaft 69. The entire wood fragment flow control and discharge assembly is supported by a vertical strut 76 positioned between two van loading sites. With gate 68 in the position as shown in FIGURE 3, the slash and chips are discharged from spout 62 into an open top van 17 positioned thereunder. When the load attains a predetermined level, a load level sensing means activates piston assembly 72 to initiate the following sequence of events: piston 73 is raised which in turn raises lever arm 74, lever arm 74 rotates shaft 69 which causes gate 68 to pivot to cover branch 66 and open branch 67. With gate 68 in this position, wood slash or chips will be discharged through spout 63 into an open top van 17 placed thereunder until a similar sequence of events is initiated by the load level sensing means of that van. It should be noted, however, that the sensing means associated with the van under spout 63 is connected to piston assembly 72 whereby upon its activation piston 73 is lowered.

A particular load level sensing means uniquely suited to control the operation of the above described piston assembly 72 and also control the delivery of energizing power to motor 18 is illustrated in FIGURES 5–7. As shown therein, a propeller load level sensing means 76 driven by a low torque motor is mounted in a vertical plane to supporting structure 31 so that the blades 77 of propeller assembly 76 extend just below the leveling bars 11 traversing the bottom flight 55 of the loop formed by the link chains 12 and 13. In those cases where a undirectional motor 18 is used to drive the continuous link chain and bar assembly, and hence the wood fragments are deposited in van 17 at one end thereof, it is preferable to mount propeller 76 at the end of structure 31 distal that end at which the fragments are deposited in van 17. As will be seen from the following description, by so mounting propeller assembly 76, the most even distribution of the load will be affected.

In operation, as the van 17 is being loaded, the propeller motor is energized to revolve propeller 76. The propeller 76 will continue to revolve until the level of the fragments deposited in van 17 attains that of the blades 77 of propeller 76. When the blades 77 encounter the wood fragments, propeller 76 is prevented from further revolving by a binding action which occurs between the blades 77 and wood fragments. Hence, by mounting propeller 76 at the end of van 17 opposite that end at which the wood slash and chips are being loaded therein, the optimum evenly distributed load will be obtained.

The propeller load leveling sensing means 76 is electrically connected to provide the various control functions through a control box 78 mounted to the outside of one end of van 17 (see FIGURES 1 and 2). Provided within control box 78, for example, are suitable circuit connection terminals and relay control circuits as needed. For example, a relay 100 may be serially connected between the armature of a series D.C. motor 18 and its energizing power source, e.g., a D.C. generator of the type normally employed in conventional trucks used to transport the vans. The relay will be of a normally open type, and will be energized to close as propeller 76 revolves.

When a loading scheme as illustrated in FIGURE 3 is to be used, and control of the position of piston 73, hence gate 68, is to be exercised by the propellers 76 and 76' in the vans 17, suitable relay control circuits must be provided. Further, it is contemplated that piston 73 will be connected to a core of an inductor control type piston assembly 72. To control its position, the energizing current delivered to the inductor 101 from a suitable source through a normally open first single contact relay 102 contained within piston assembly 72. With the relay 102 contacts opened, piston 73 will be in its lowered position and the wood fragments will be delivered from chute 61 to be discharged from spout 63. To provide for the selective control of the state of the signal contact relay 102, a double contact relay 103 and a second single contact normally closed relay 104 are mounted within piston assembly 72. The contacts of the double and second single contact relays are connected to form two conducting paths between an energizing source and the energizing relay of the first single contact relay 102. The first path is directly through the double contact relay from its pole to one of its contacts. This relay is controlled by propeller 76 through a suitable cable connection 106 through box 78 of the van 17 positioned under chute 62. The connection is made such that as that propeller 76 revolves, switch contacts 107 are closed to energize the relay coil of the double contact relay 103 to close the first conducting path. Further, when the propeller 76 is stopped the first path will be opened. When the path is open, the pole of the double contact relay 103 will be connected to the second contact thereof. Also, to this contact is connected the pole of the second single contact relay 104. This relay's energization is controlled by propeller 76' through a suitable cable connection through a control box 78 of van 17 positioned under chute 63. When this propeller 76' is stopped from revolving, switch contacts 108 are opened to de-energize the relay coil of the normally closed relay 104, thereby closing the contacts of the relay to complete the second conduction path. On the other hand, when this propeller 76' is revolving, the relay coil of the second single contact relay 104 is energized to open the second conduction path. Hence, as can be seen from the foregoing, wood slash or chips will be discharged through branch 66 and spout 63 only when the propeller 76' in the van 17 under spout 63 is revolving while simultaneously, the propeller in the van 17 under spout 62 is stopped. However, by employing a self locking relay arrangement including normally closed contacts 109 controlled by relay coil 106', in connection with the second single contact relay, once the wood fragments are being discharged through spout 63, they will continue to be so discharged until the van 17 placed thereunder is filled to the level desired and its level sensing propeller 76' is stopped from revolving.

By employing an automatic loader and load leveling system in accordance with that described hereinabove, it seems that a single individual can attend to the loading of wood slash or chips into vans for storage and eventual transportation. It is noted that even more than two vans can be loaded simultaneously in the manner described supra. It is only necessary that additional spouts and control gates be coupled to the discharge chute along with suitable gate control circuits of the character set for the imediately hereinabove. Conversely, by utilizing a single contact relay to control the position of gate 68 in a single spout discharge chute system, the flow of wood fragments therefrom can also be controlled automatically.

Turning now to the loading and storing method of the present invention, it is first proposed to collect the wood trimmings produced during the various sawing operations and convey them by a suitable conveyor to chute conveyor. Generally, it is desirable to reduce the trimmings to chip size prior to loading them in vans. In such cases, the trimmings would be first delivered to a chipper, and the resulting chips produced delivered to the chute conveyor.

Now, referring again to FIGURES 1 and 2, the chips delivered to the chute 6 are conveyed directly thereby to spout 24. The chips are discharged from spout 24 to fall into a van 17 positioned thereunder. When the van 17 is filled to the desired volume, the discharge of chips therein is terminated. The van 17 is then removed from beneath the spout 24 and taken to a parking area and stored thereat until they are to be transported by truck for delivery. A second van 17 is then positioned beneath spout 24 for loading as outlined above.

To optimize the load placed in van 17, the wood chips are evenly distributed throughout van 17 as they are loaded therein. The distribution of the chips may be accomplished, for example, by the load leveling apparatus described hereinbefore or any of the prior art wood fragment load leveling techniques.

In large chip volume operations, the wood chips produced at the lumbermill can be conveyed along multiple paths to be loaded in vans located at different sites. For example, in FIGURE 3 there is shown a single chute double spout assembly for loading vans at two sites. Furthermore, the wood chip loading and storing method may be carried on automatically by utilizing apparatus, for example, of the nature described supra. The significant factor of the loading and storing method of the present invention, and from which essentially all of the attendant advantages hereinbefore enumerated evolve, is that the steps thereof are carried out in a single continuous sequence.

What is claimed is:

1. A load leveler for distributing wood fragments being loaded into an open top van having a bed and vertical walls defining its length and width dimensions comprising; first and second supporting members mounted in horizontal planar alignment within said van each individually proximate one of first and second opposite walls thereof defining its length dimension and extending for substantially the full length of said van; a drive shaft journally mounted at a first end thereof to said first supporting member proximate one end of said van and at a second end thereof to said second supporting member to extend perpendicularly between said supporting members; first and second driven sprockets affixed to said drive shaft proximate respectively said first and second journaled ends thereof; first and second idler sprockets rotatably supported at the second end of said van by said first and second supporting members and an idler shaft mounted therebetween, said idler sprockets mounted spaced apart the same distance as said driven sprockets; first and second continuous link chains each individually mounted to engage about one of the first and second sprocket combinations formed respectively by first driven and first idler sprockets and second driven and second idler sprockets; a plurality of bars mounted to extend perpendicularly between said first and second chains at spaced intervals to provide with said chains an apertured structure which is moveable on said sprockets, said first and second supporting members including supports extending lengthwise of said van between said driven sprockets and said idler sprockets upon which the lengthwise edges of said apertured structure slidably rest to provide support for said structure for its full length; and means for coupling a motor drive to rotate said drive shaft.

2. The load leveler according to claim 1 wherein said first and second supporting members include U-shaped channel segments which extend between said driven and idler sprockets, said first and second U-shaped channels each defining respectively upper and lower planar flanges extending inwardly away from the walls of said van, said flanges having upper and lower surfaces, said bars are mounted to the sides of said chains distal the sides adjacent the sprockets and their respective ends extend beyond said chains to slidingly rest on the upper surfaces of the upper and lower flanges of the U-shaped channel segments as the drive shaft is rotated by said motor drive.

3. A load leveler as recited in claim 1 further defined as comprising means for selectively adjusting the elevation position of said supporting members.

4. A load leveler as recited in claim 1 further defined as comprising a wood fragment level sensing means responsive to a predetermined level to which the wood fragments are loaded in said van by preventing the power transmission from the motor drive to said drive shaft.

5. A load leveler for evenly distributing wood fragments throughout an open top van being loaded at one end thereof, said van having a bed and vertical walls defining its length and width dimensions, the combination comprising a rectangular-like frame slightly smaller than the cross sectional area of said van defined by its vertical walls vertically slidably mounted within said van parallel to its bed, said frame including U-shaped channel segments extending along the length of said van at each side thereof, said U-shaped channel segments defining upper and lower planar flanges interconnected by a web and extending inwardly away from the walls of said van, said flanges having upper and lower surfaces; a drive shaft journally mounted at each end thereof perpendicular to respective webs of opposite U-shaped channel segments, said drive shaft mounted to said channel segments at the end of said van distal the end at which the wood fragments are being loaded into said van; an idler shaft journally mounted at each end thereof perpendicular to respective webs of opposite U-shaped channel segments in the same plane as said drive shaft at the end of said U-shaped channel segments distal said drive shaft; first and second driven sprockets affixed spaced apart to said drive shaft between the opposite U-shaped channel segments; first and second idler sprockets affixed spaced apart to said idler shaft, said idler sprockets spaced apart the same distance as said driven sprockets, said upper planar flange extending only between the idler and driven sprockets; first and second continuous link chains each individually mounted to engage about one of the driven and idler sprocket combinations formed respectively by first driven and first idler sprockets and second driven and second idler sprockets; a plurality of rectangular wooden bars mounted to extend perpendicularly between said first and second chains, said bars mounted at spaced intervals to the side of said chains distal that side which resides adjacent to said sprockets when said chains are engaged thereby, the lengths of said bars selected to be just less than the perpendicular distance between said webs of said U-shaped channel segments, the size of said sprockets and their mounting position relative to said upper and lower flanges is selected so that said bars will slidably rest on the upper surfaces of the lower flanges and be guided along a path spaced above the upper surfaces of the upper flanges a distance approximately equal to the thickness of said chains; guide bars mounted along the upper surfaces of said upper flanges of respective U-shaped channel segments, the thickness of said guide bars approximately equal to the thickness of said chains; tab projections secured to said upper flanges at spaced intervals therealong, said projections extending to support from beneath said chains passing adjacent to said upper flanges; four vertically oriented hydraulic jack operated pistons adapted to support said rectangular-like frame at its respective corners, said pistons operated collectively as a unit to selectively adjust the elevation position of said frame; a motor and support mounted to said frame at one side thereof at the drive shaft end; a single strand roller chain drive means for coupling said motor to rotate said drive shaft, and a motor driven propeller having at least one blade mounted to said frame at its drive shaft end to have its blade extend just below the lower flange of said U-shaped channel segment, said propeller operatively connected to allow said motor to be energized to rotate said drive shaft when said propeller is rotating and prevent the energization of said motor when said propeller is prevented from rotating.

References Cited

UNITED STATES PATENTS

| | | | |
|---|---|---|---|
| 2,111,663 | 3/1938 | Graemiger | 214—17 X |
| 2,185,415 | 1/1940 | Miles | 214—83.26 |
| 2,717,703 | 9/1955 | Kull et al. | 214—17 |
| 3,167,193 | 1/1965 | Klosk | 214—41 X |

GERALD M. FORLENZA, *Primary Examiner.*

ROBERT G. SHERIDAN, *Assistant Examiner.*